Figure 1:
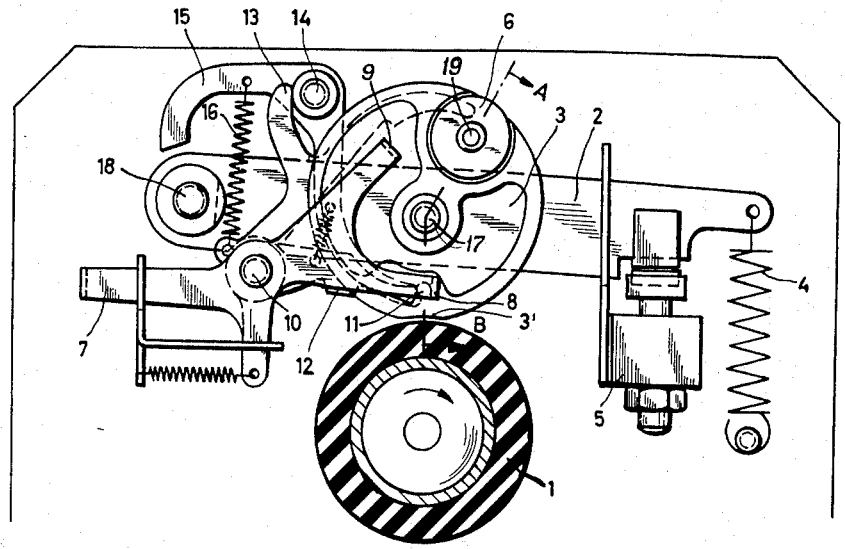

March 22, 1966  B. NITSCHKE  3,241,383
FRICTION DRIVE
Filed May 4, 1964

Inventor:
Bruno Nitschke.

United States Patent Office 3,241,383
Patented Mar. 22, 1966

3,241,383
FRICTION DRIVE
Bruno Nitschke, Munich, Germany, assignor to Siemens & Halske Aktiengesellschaft, Berlin and Munich, Germany, a corporation of Germany
Filed May 4, 1964, Ser. No. 364,848
Claims priority, application Germany, May 7, 1963, S 85,080
6 Claims. (Cl. 74—216)

The invention relates to a friction drive utilizing a continuously driven drive roller and a rotatably supported driven roller which may be engaged with the drive roller through frictional contact.

In friction drives there frequently arises the requirement that the driven members be stopped while the drive roller is continuously operated. In known friction drives this is achieved through the feature that the friction drive roller and driven roller is disconnected by an arrangement wherein the drive roller and the driven member are disengaged from each other by movement of a swinging lever on which either the drive roller or the driven member is rotatably supported. To achieve a complete stopping of the driven member at a certain angular position thereof, there are additionally provided suitable stop levers.

In friction cam drives, devices are known in which special means is not required to effect disengagement of the frictional connection. In such drives the frictional driven surface of the driven member is so formed that at a selected position of the drive member, at which suitable members stop the driven member, the frictional connection is discontinued. However, further means are needed in this case for restarting the driven member, as for example, a pre-tensioned spring. In such friction drives it is, for technical reasons, impossible to fix the stopping position of the driven member at any arbitrary angular position, as the disconnection is effected only by separation of the contact surfaces, resulting from the alignment of a recess or depression in the driven member, when the driven member is in its rest position.

The object of the invention is to present a reliably operating, simply constructed friction drive in which the driven member can be stopped in any predetermined position, as may be selected by its design organization, and which is achieved according to the invention by an arrangement wherein a roller is rotatably supported by the driven member in such a way that the friction surface of the driven member is interrupted in the vicinity of the roller and is replaced by a segment of the circumference of the roller, stop members being arranged for stopping the driven member in the operative engageable range of the roller. The driven member, according to the invention, can be formed in any known manner, as for example, as a roller mounted on a shaft for rotation about a fixed axis or as a cam roller supported on a swinging lever.

According to a further development of the invention, the stop members for the driven member are so arranged and dimensioned that in the power connected stopping position, in which the roller carried by the driven member is engaged with the drive roller, the axis of the roller of the driven member is spaced in the direction of movement, from a line connecting the axes of the drive roller and the driven member. Thereby the existing torque, acting through the friction of the axis of the roller applied to the driven member when in stop position is supplemented by a component of the contact pressure of the driven member on the drive roller.

If several stop positions of the driven member are required, according to a further development of the invention, a number of rollers may be carried by the driven member, in which arrangement, preferably a lever, controlled for example by an electromagnet, is provided with stop arms which are so arranged that in each of its selectively adjusted positions one of such stop arms is disposed in the rotational path of one of several stop pins arranged on the revolving driven member. In order to prevent rebounds during the stopping operation, a buffer lever is preferably provided for each stop arm.

With the aid of the drawing, there is described in the following an example of a friction drive according to the invention, in which the driven member is a cam supported upon a swinging lever, having such cam configuration that the driven cam is stopable in a power connected position.

Figure 2:
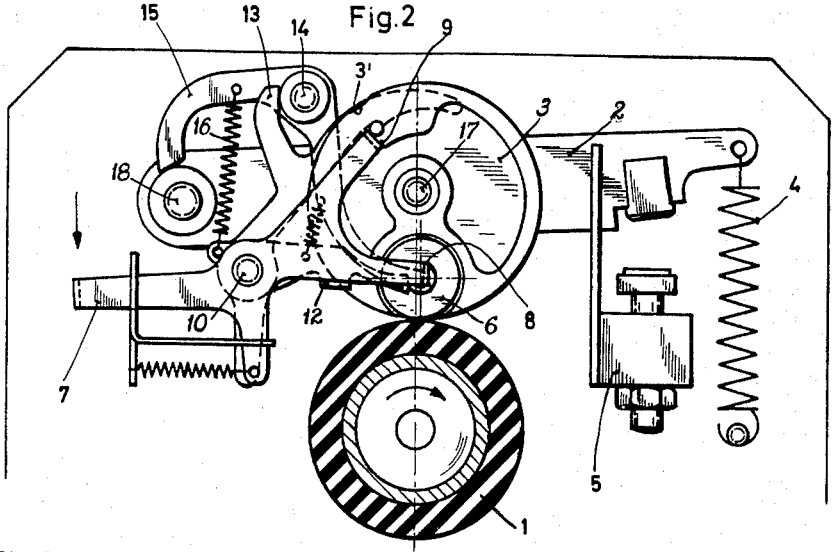
Figure 3:
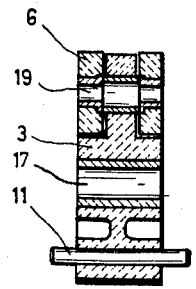
Figure 4:
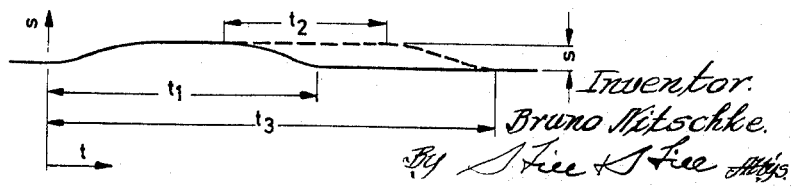

FIG. 1 illustrates the friction drive in a stop position employing the known arrangement;
FIG. 2 illustrates the friction drive in a stop position employing an arrangement according to the invention;
FIG. 3 is a transverse section through the driven member taken approximately on the line A–B of FIG. 1; and
FIG. 4 illustrates the time path diagram of the friction drive.

Disposed adjacent the continuously operated drive roller 1 is a driven cam roller 3 rotatably supported on a swinging lever 2, a spring 4 connected to the swinging lever 2 providing the drive pressure between the cam roller 3 and the drive roller 1. An adjustable stop device 5 for the swinging lever 2 prevents frictional engagement of the cam roller 3 with the drive roller 1 when the recess 3' in the cam roller 3 is disposed opposite the drive roller 1. The high portion of the cam roller 3 is provided with means for rotatably supporting a roller 6. In the embodiment illustrated, two rollers 6 are utilized. A control lever 7, controlled by an electromagnet (not illustrated), is supported on a shaft 10 and provided with two stop arms 8 and 9, each of which has an angularly bent end portion cooperable with a stop pin 11 arranged on the cam roller 3. Cooperable with the two stop arms 8 and 9 are levers 12 and 13, pivotally supported on the shaft 10. The two levers 12 and 13 prevent rebounding of the cam roller 3 when the stop pin 11 arranged thereon engages either of the two stop arms 8 and 9 of lever 7. Another lever 15 pivotal about an axis 14 serves as a power transmission member for applying the force stored in a spring 16 to the stop pin 11 arranged on the cam roller 3, for imparting a starting movement to the latter.

The operation of the friction drive described is as follows:
Assuming that the parts of the drive are in the position indicated in FIG. 1, the recess 3' of the cam roller 3 is disposed opposite the drive roller 1, and the cam roller 3 is therefore disengaged from the drive roller. Rotation of the roller 3 in its driven or counterclockwise direction is prevented by engagement of the stop arm 8 with the pin 11, while movement of the roller 3 in a clockwise direction is prevented by the engagement of the pin 11 with the adjacent end of the lever 12.

Pivoting of lever 7 counterclockwise effects release of the angular end portion of the stop arm 8 with stop pin 11 of the cam roller 3. The cam roller 3 is rotated counterclockwise on its bearings 17 by means of the lever 15 biased by the spring 16, the lower arm of which lever engages the opposite end of the stop pin 11. Rotation of the cam roller 3, initiated by the stored spring energy, is sufficient to close the air gap initially present between drive roller 1 and the cam roller 3 in the zero position. After contact of the peripheral frictional surface of the cam roller 3 with the rotating drive roller 1, further rotation of the cam roller takes place by means of the frictional engagement. The release lever 7 is retained in released position, as illustrated in FIG. 2, by suitable means, as for example, by a spring latch (not illustrated in the drawing). The stop arm 9 of lever 7, in such released position, is thereby disposed in the trajectory of the stop pin 11 of the cam roller 3, rotating about the bearing 7 and pivoted about the bearing pin 18. Rotation of the roller 3 continues until the stop pin 11 engages the stop arm 9, which thereby prevents further rotation of the cam roller 3. Rebound of the cam roller 3 is prevented by lever 13 disposed at the rear side of the roller 3, as viewed in FIGS. 1 and 2, by means of the latching thereof over the stop pin 11. The rollers 6, which are illustrated as being axially pressed on a freely rotatable shaft 19, have thereby rotated to a point beyond the connecting line of the axes of the drive roller 1 and the cam bearing 13, as is apparent from a reference to FIG. 2. During the arrested motion of the cam roller 3 and the swinging lever 2, the rollers 6 turn with the same circumferential velocity as the drive roller 1, the swinging lever 2 being supported in this position against the resetting force of the tension spring 4, over the bearings 17 and 19. Contact of the friction surface of the cam with the drive roller 1 is prevented in the intermediate stop position by the relieved contour of the portion of the cam roller 3 disposed between the roller 6, as apparent from FIG. 3.

If the lever 7 is then returned to its starting position, the stop pin 11 is again released, this time from its engagement with the stop arm 9. The cam roller 3, through the frictional forces existing in the bearing 19 and through the component of the supporting force resulting from the disposition of the axis of rollers 6, to the right of the drive roller axis, a clockwise rotating movement is produced. After a short rotation of the cam roller 3 out of the intermediate stop position, the roller 6 becomes inactive. Through the renewed contact of the cam friction surface with the drive roller 1, the remaining rotation of the cam roller into its starting position takes place. During the last part of this movement of cam roller 3, the spring 16 is tensioned by movement of lever 15, through engagement of the latter with the stop pin 11, which lever is thereby restored to its starting position.

Upon the cam roller 3 reaching its end position, there again takes place a separation of the frictional surface of the roller 3 from the drive roller 1, and the stop pin 11 is re-engaged by the stop arm 8 of lever 7. Rebound of the cam roller 3 is prevented by the lever 12 supported on the axis 10.

According to the time path diagram of FIG. 4, which is plotted as the movement of the swinging lever 2, pivoting on the bearing pin 18, S corresponds to the stroke of the swinging lever 2, and $t$ represents time. The time $t_1$ thus corresponds to the time with the cam rotation which does not include the intermediate stop, $t_2$ the time during the intermediate stop, and $t_3$ the total time with a cam rotation which includes an intermediate stop.

If an intermediate stop is not necessary, the lever 7, after completion of its release movement, is immediately reset. The cam roller than executes a full revolution without an intermediate stop and the course of movement takes place in the time $t_1$.

The drive according to the invention is intended particularly for fine mechanical devices, teletype instruments, typewriting and calculating office machines and the like.

Changes may be made within the scope and spirit of the appended claims which define what is believed to be new and desired to have protected by Letters Patent.

I claim:

1. A friction drive, comprising a continuously rotatable drive roller, a driven member, rotatably supported, and disposed for frictional engagement with the drive roller, and stop members for stopping rotation of the driven member, at least one roller rotatably supported by the driven member, said roller being so disposed that the friction surface of the driven member is interrupted adjacent the roller and is replaced by a segment of the circumference of such roller.

2. A friction drive according to claim 1, wherein the stop members for the driven member are so arranged and dimensioned that in the stop position, in which the roller is cooperable with the drive roller, the axis of the roller is spaced, in the direction of movement, from the connecting line of the axes of the drive roller and of the driven member.

3. A friction drive according to claim 2, wherein, for each stop arm, a lever is provided engageable with a stop pin for preventing rebounds of the cam roller.

4. A friction drive according to claim 1, having a plurality of stopping points, wherein a lever having a plurality of stop arms and controlled, for example, by an electromagnet, is so disposed that in each of its selective positions of adjustment, one of its stop arms is positioned in the path of revolution of a stop pin carried by the cam roller.

5. A friction drive according to claim 4, wherein, for each stop arm, a lever is provided engageable with a stop pin for preventing rebounds of the cam roller.

6. A friction drive according to claim 1 wherein, for each stop arm, a lever is provided engageable with a stop pin for preventing rebounds of the cam roller.

No references cited.

DON A. WAITE, *Primary Examiner.*